United States Patent
Dow et al.

(10) Patent No.: US 11,319,935 B2
(45) Date of Patent: May 3, 2022

(54) METHOD FOR REPLACING A WIND TURBINE PAD

(71) Applicant: Siemens Gamesa Renewable Energy A/S, Brande (DK)

(72) Inventors: Andrew Dow, Orlando, FL (US); Kelly White, Orlando, FL (US)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/047,476

(22) PCT Filed: Apr. 16, 2018

(86) PCT No.: PCT/US2018/027746
§ 371 (c)(1),
(2) Date: Oct. 14, 2020

(87) PCT Pub. No.: WO2019/203783
PCT Pub. Date: Oct. 24, 2019

(65) Prior Publication Data
US 2021/0115905 A1   Apr. 22, 2021

(51) Int. Cl.
*F03D 80/50* (2016.01)
*F03D 80/70* (2016.01)
*F03D 7/02* (2006.01)

(52) U.S. Cl.
CPC .......... *F03D 80/50* (2016.05); *F03D 7/0204* (2013.01); *F03D 80/70* (2016.05)

(58) Field of Classification Search
CPC ......... F03D 80/50; F03D 80/70; F03D 7/0204
See application file for complete search history.

(56) References Cited

U.S. PATENT DOCUMENTS

2012/0139257 A1* 6/2012 Tobinaga ............... F03D 13/20
290/55
2015/0047270 A1* 2/2015 Gotfredsen ............ F16C 33/26
52/123.1

FOREIGN PATENT DOCUMENTS

| EP | 2 711 568 A1 | 3/2014 |
| EP | 2 837 818 A1 | 2/2015 |
| EP | 3 139 034 A1 | 3/2017 |

OTHER PUBLICATIONS

International Search Report and Written Opinion dated Jan. 24, 2019 for PCT/US2018/027746.

* cited by examiner

*Primary Examiner* — Sean Gugger
(74) *Attorney, Agent, or Firm* — Schmeiser, Olsen & Watts LLP

(57) ABSTRACT

A method of replacing a plurality of yaw pads is provided. Yaw pads are arranged between a tower and a nacelle of a wind turbine. The yaw pads are replaced with new yaw pads. The method includes determining the center of gravity of the nacelle. Based on the center of gravity, a set of the plurality of yaw pads to be each substituted by a shim are selected. Each of the substituted shims including a thickness greater than the respective replaced yaw pad. The remaining yaw pads are replaced while the nacelle is supported by the shims.

16 Claims, 5 Drawing Sheets

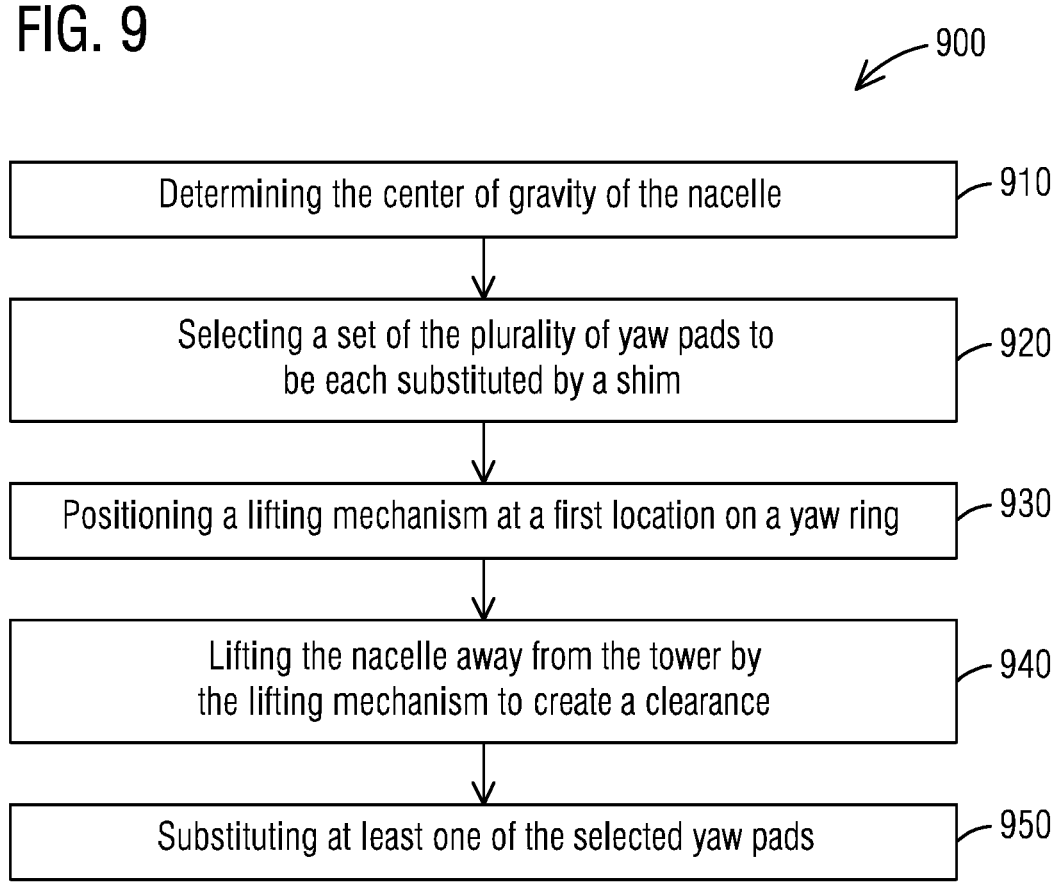

METHOD FOR REPLACING A WIND TURBINE PAD

CROSS-REFERENCE TO RELATED APPLICATIONS

This application claims priority to PCT Application No. PCT/US2018/027746, having a filing date of Apr. 16, 2018, the entire contents of which are hereby incorporated by reference.

FIELD OF TECHNOLOGY

The following generally relates to a wind turbine and method and for replacing a wind turbine pad arranged between the nacelle and tower.

BACKGROUND

Referring to FIG. 1, a wind turbine includes a tower 12 and a nacelle 14. The nacelle 14 includes a hub 16 to which one or more blades 18 may be attached. In operation the nacelle 14 rotates, about the axis A of the tower, to position the nacelle according to the wind direction. This rotation R is referred a yaw. Yaw pads 20 are arranged between the tower 12 and nacelle 14 to provide a low friction surface for smooth yawing of the nacelle 14 as the nacelle slides across the pads. The yaw pads 20 get worn during the yawing and need to be replaced. The nacelle 14 is heavy making the replacement challenging.

Pulling the nacelle up off tower, to provide a space between the tower and nacelle 14, is difficult. Cranes may be used to pull up on the nacelle to lift the nacelle off the tower. Support frames may be used to support the lifted nacelle. The pads may be replaced while the nacelle is lifted. Since the entire nacelle is lifted each of the yaw clamps must be loosened. The longer the yaw clamps are loosened the more potential for damage that may occur. Cranes are expensive to use. Additionally, it is difficult to safely lift the nacelle while placing the support structure in place.

Referring to FIG. 2, the nacelle 14 may be tilted at a pivot point P to produce a gap 22 opposite of the pivot point P. This allows access at the gap 22 to replace pads. Only yaw pads opposite of the pivot having sufficient access at the gap 22 may be replaced; therefore, the process must be repeated, which is time consuming. The process requires yawing the nacelle in place, loosening a yaw clamp, tilting the nacelle, replacing yaw pads opposite of the pivot, and tightening of yaw clamps. Tilting the nacelle puts high point loads on the components. This makes it possible to damage pads that were already replaced during the repeated process. Tilting may be achieved using gravity for a nacelle having a center of gravity C beyond the diameter of the tower. Presently the current solutions have short comings such as expensive, time consuming and safety concerns.

SUMMARY

An aspect relates to methods and systems that may be used to facilitate the method of replacing a plurality of yaw pads with new yaw pads. The yaw pads are arranged between a tower and a nacelle of a wind turbine.

In an embodiment, the center of gravity of the nacelle is determined. Based on the center of gravity, a set of the plurality of yaw pads is selected. Each of the selected yaw pads is substituted by a shim. Each of the substituted shims has a thickness greater than the respective replaced yaw pad. The nacelle is balanced on the shims after the replacements. The remaining of the plurality of yaw pads are replaced with new yaw pads after substituting. After the remaining of the plurality of yaw pads are replaced, the shims are replaced with new yaw pads.

In another embodiment, the center of gravity of the nacelle is determined. Based on the center of gravity, a set of the plurality of yaw pads are selected. Each of the selected yaw pads are substituted by a respective shim. Each of the shims include a thickness greater than the respective replaced yaw pad. A lifting mechanism is positioned at a first location on a yaw ring. The the nacelle is lifted by the lifting mechanism away from the tower to create a clearance. A first of the set of the plurality of yaw pads are replaced with the respective first shim. The nacelle is lowered onto the respective first shim. The remaining of the plurality of yaw pads are replaced with new yaw pads. After the remaining of the plurality of yaw pads are replaced, each of the shims are replaced with new yaw pads.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION

Some of the embodiments will be described in detail, with reference to the following figures, wherein like designations denote like members, wherein:

FIG. 9 is a flowchart of a second method for replacing a plurality of yaw pads.

DETAILED DESCRIPTION

Figure 1:
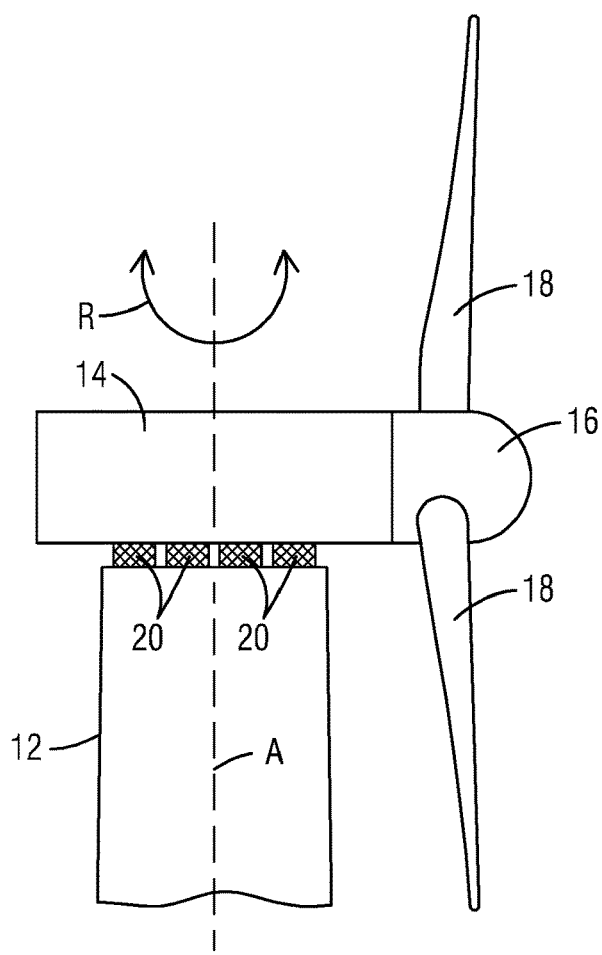
FIG. 1 illustrates a first side view a wind turbine according to conventional art.
Figure 2:
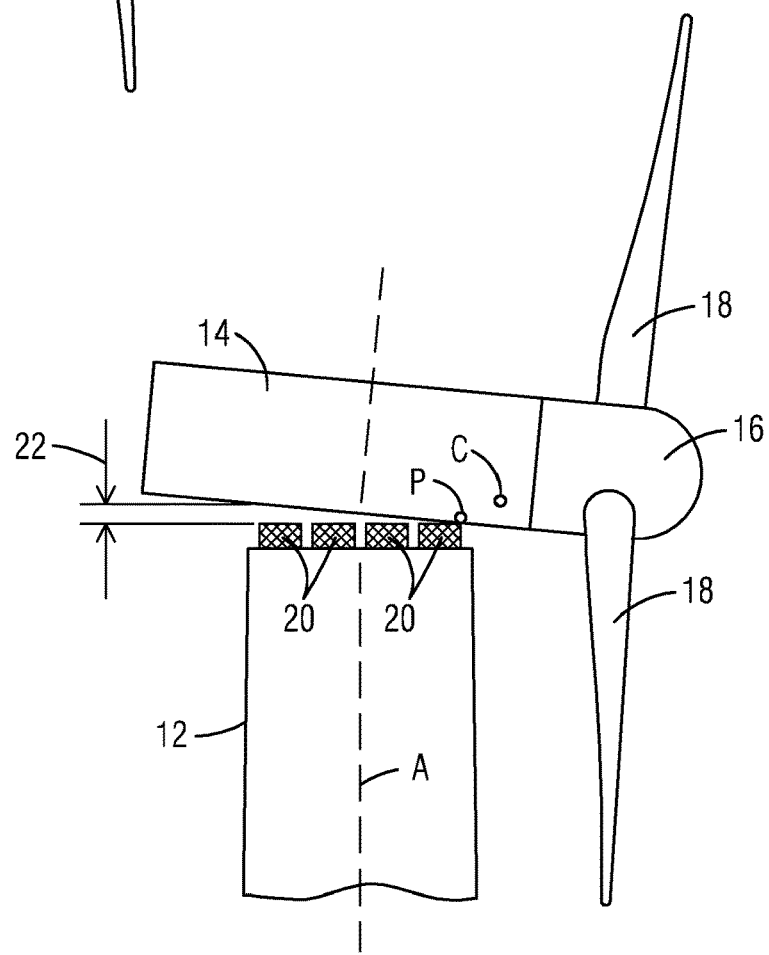
FIG. 2 illustrates a second side view of a wind turbine according to conventional art.

Various technologies that pertain to methods and systems that facilitate replacing a wind turbine pad will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Figure 3:
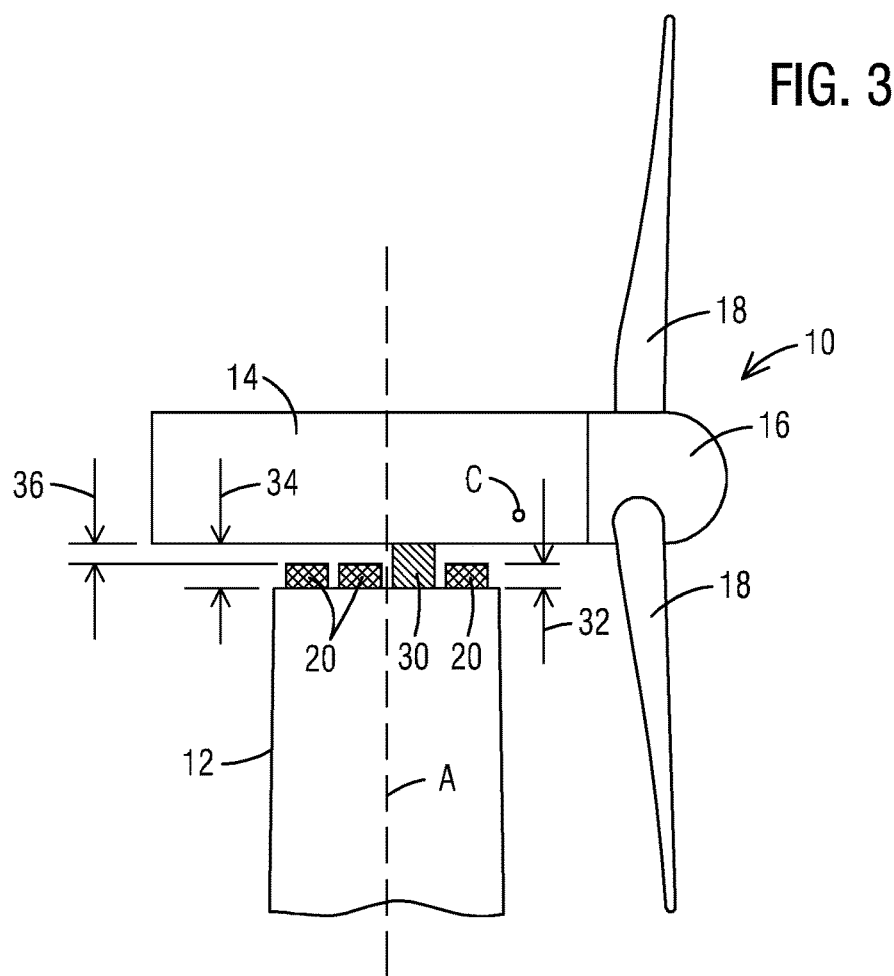
FIG. 3 illustrates a side view of a wind turbine that facilitates carrying out one or more of the embodiments described herein.

FIG. 3 illustrates a side view of a wind turbine 10 that facilitates carrying out one or more of the embodiments described herein. The nacelle 14 having a center of gravity C which may be at any location relative to the diameter of the tower 12. While the illustrated embodiment shows the center of gravity outside the diameter of the tower, the center of gravity C may be inside the diameter of the tower 12 or at the diameter of the tower 12.

Based on the center of gravity, a portion of the plurality of yaw pads 20 are substituted. Each by a shim 30. Each of the shims 30 having a thickness 34 greater than a thickness 32 of the yaw pad 20 being replaced. Yaw pads 20 to be substituted are based on the center of gravity C of the nacelle so that the nacelle may be balanced on the shims. Accordingly, the location of the substitution may be selected such that the nacelle is balanced on the shims. The balance may be without any further support so that the shims will act as the balance point for the nacelle. FIG. 3 illustrates the nacelle 14 being supported by shims 30 that have been substituted for the respective yaw pads 20. Only a single shim 30 is visible in the illustration of FIG. 3.

With the shims 30, each including a thickness 34 greater than the thickness 32 of the respective yaw pads 20, a clearance 36 between the nacelle 14 and the tower 12 is formed providing easy access to the yaw pads 20. The remaining yaw pads 20, not having been substituted, may be replaced with new yaw pads. After a yaw pad is removed, a new yaw pad is inserted; thereby, replacing the respective yaw pad.

Each shim 30 may be formed from or include any material suitable to support the nacelle 14. The material of the shim 30 is suitable when sufficient to support the nacelle throughout the duration of replacing the yaw pads with new yaw pads. For example, shim 30 may include or be formed of the same material as the material of the yaw pads 30. Shim 30 may include or be formed of harder material as than yaw pads 30.

Figure 4:
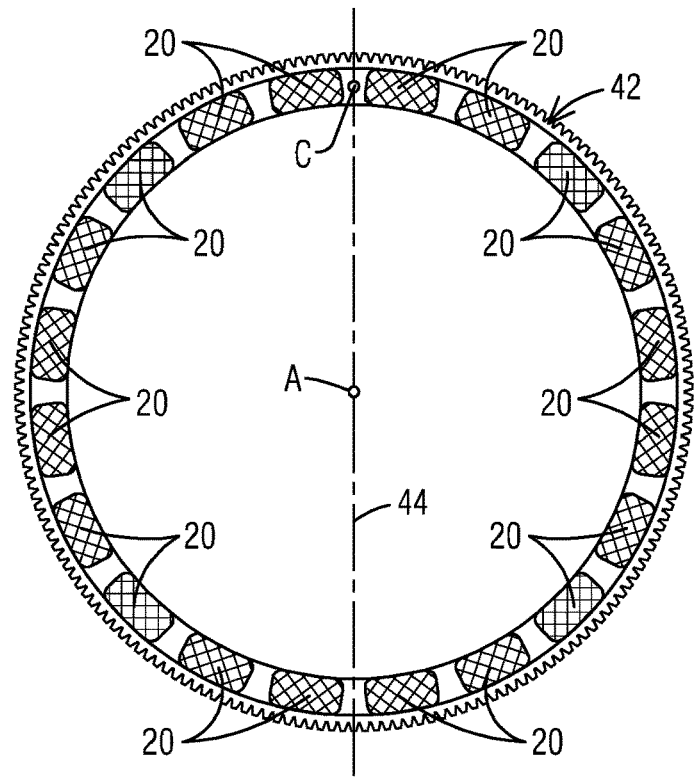
FIG. 4 illustrates a first plan view of the wind turbine that facilitates carrying out one or more of the embodiments described herein.

FIG. 4 is a plan view of a section of the wind turbine and illustrates a top view of yaw pads 20 according to an embodiment that facilitates carrying out one or more of the embodiments described herein. The yaw pads 20 are distributed on a yaw gear 42. A center line 44 passes through the center of gravity C and the axis of rotation A. In the present illustration, the center of gravity C is at or substantially near the diameter of the tower.

Figure 5:
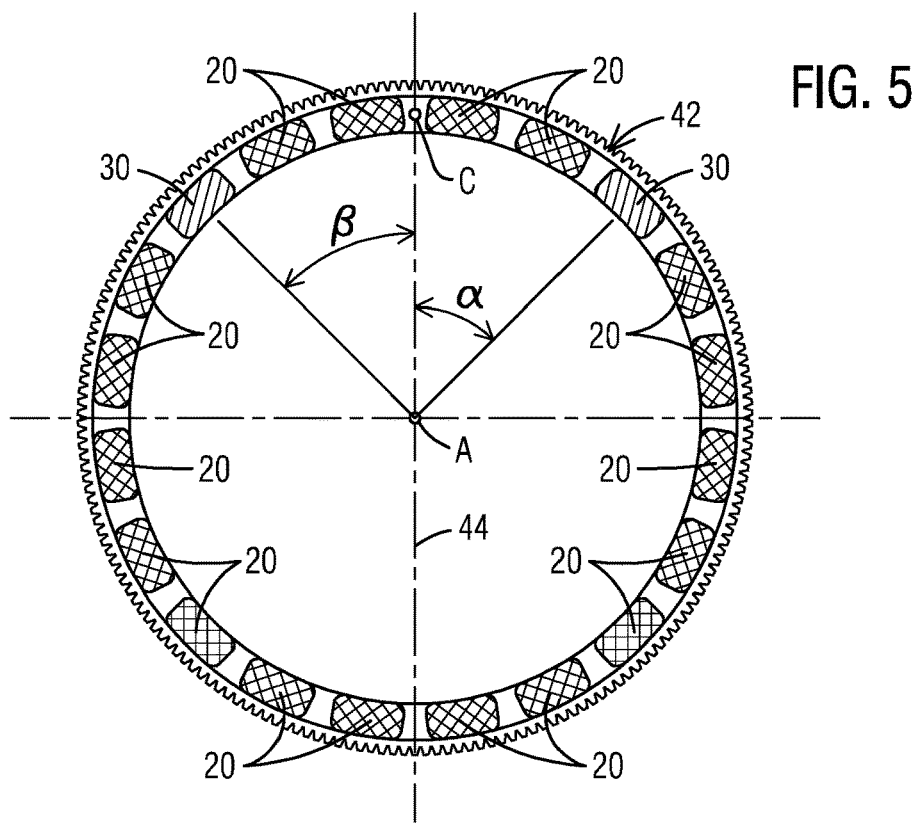
FIG. 5 illustrates a second plan view of the wind turbine that facilitates carrying out one or more of the embodiments described herein.

FIG. 5 illustrates an example of a substitution of selected yaw pads of FIG. 4 according to an embodiment. A first shim 30, which is substituted for a first yaw pad 20, is arranged at an angle α from the center line 44, A second shim 30, which substitutes a second yaw pad 20, is arranged at an angle β from the center line 44. In an embodiment, angle α and angle β are such that the first shim 30 is on the opposite side of the center line than the second shim 30. The angle α and angle may have the same or substantially the same measure but are arranged on opposite sides of the center line 44. For example, angle α is 45° and angle β is −45°. While the example illustrates a substitution of two yaw pads 20, this is merely for illustrative purposes. One skilled in the art would recognize that more than two yaw pads 20 may be substituted with shims 30.

Figure 6:
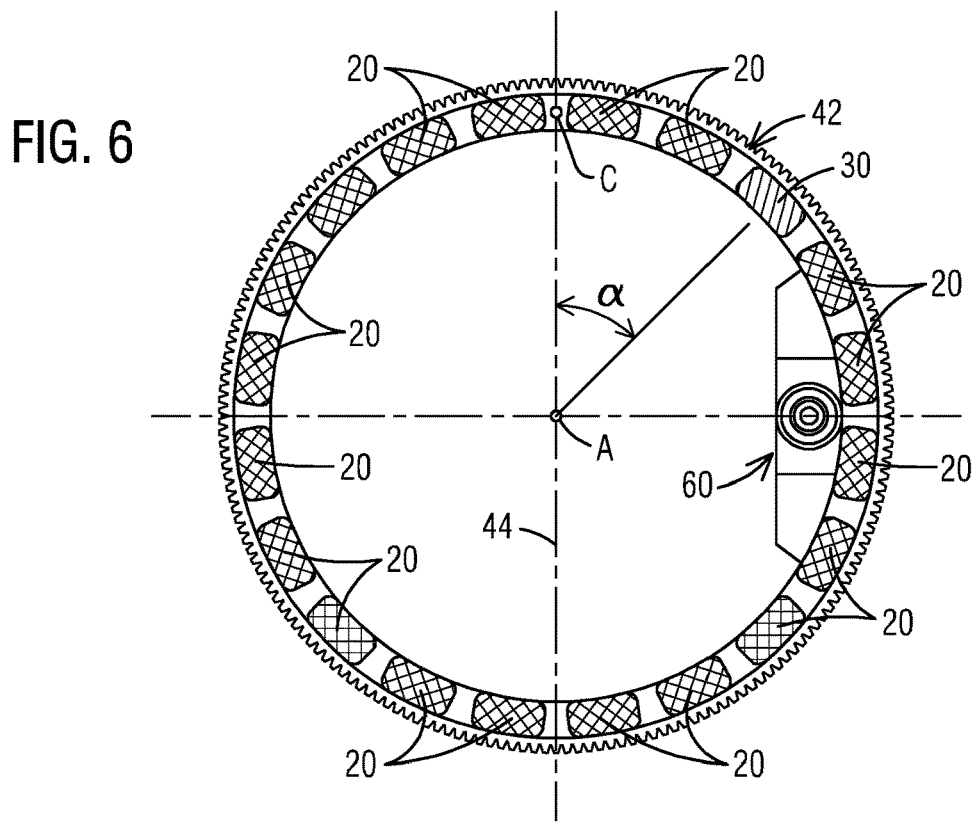
FIG. 6 illustrates a third plan view of the wind turbine that facilitates carrying out one or more of the embodiments described herein.

According to an embodiment, FIG. 6 includes a lifting mechanism to the plan view of FIG. 5. In order to substitute a yaw pad, a clearance is created at the location where the shim 30 is to be substituted. After the clearance is created, the respective yaw pad 20, at the location, is removed and substituted by the shim 30.

A lifting mechanism may be used to create the clearance. In an embodiment, the lifting mechanism 60 is embodied as a jack. The lifting mechanism 60 lifts the nacelle 14 away from the tower 12 to expose the yaw pad 20 to be substituted by the shim 30. The lifting mechanism 60 lifts the nacelle by applying a pushing force which pushes the nacelle away from the tower 12. Hydraulics and/or pneumatics may be employed by the lifting mechanism 60 to provide the lifting force.

The positioning of the lifting mechanism 60 is based on the center of gravity C and the location in which the shim 30 is substituting the yaw pad 30. The position is such that when the lifting mechanism 60 lifts the nacelle 14, a sufficient clearance for the yaw pad 20 to be removed and for the thicker shim 30 to be substituted is created. Positioning of the lifting mechanism 60, for example, includes arranging the lifting mechanism 60 so the yaw pad to be substituted is between the lifting mechanism and the center of gravity C. According to the illustrated embodiment, the lifting mechanism 60 is at an angle 90° from the center of gravity C. The angle of the lifting mechanism and the angle of the substituted yaw pad 30 are merely for illustrative purposes and not to be limiting.

Figure 7:
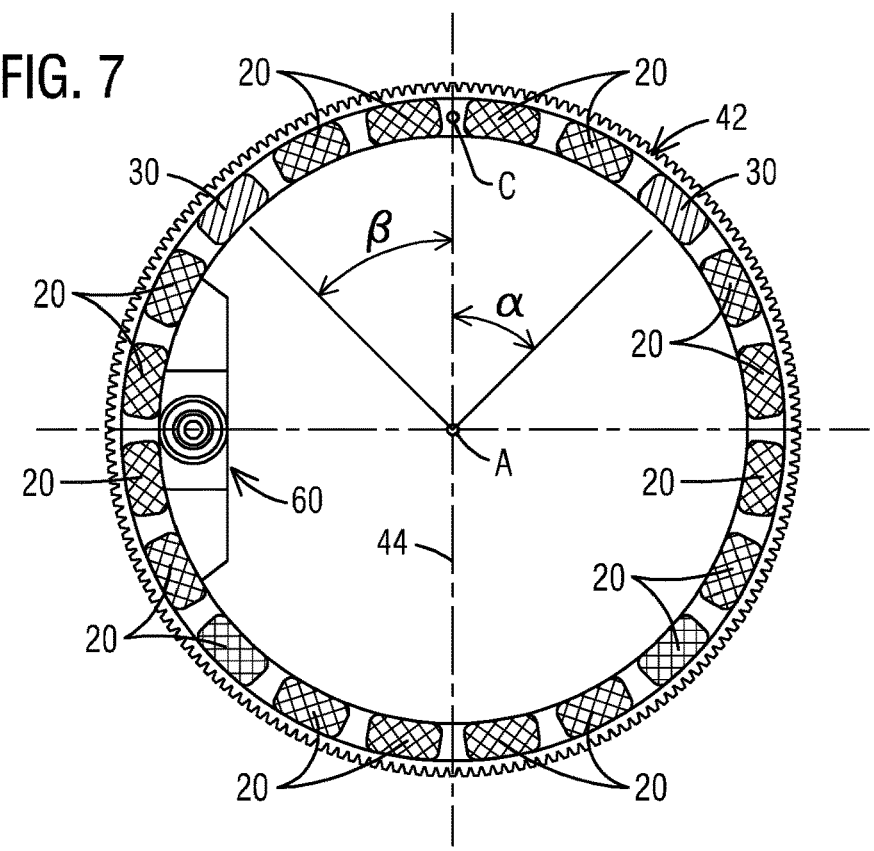
FIG. 7 illustrates a fourth plan view of the wind turbine that facilitates carrying out one or more of the embodiments described herein.

FIG. 7 includes the lifting mechanism in a second position. The lifting mechanism 60 may be moved to a second position to create a clearance at the location where the second shim 30 is to be substituted. According to an embodiment, the second position is opposite the center line from the first position. In the illustrated embodiment, the second position is 180° from the first position.

In an embodiment, the positioning the lifting mechanism 60 to the second position may be achieved by manually relocated the lifting mechanism 60. A manual relocation being removing the lifting mechanism 60 from the yaw ring and reattaching the lifting mechanism 60 at the second location. In another embodiment, the positioning the lifting mechanism 60 to the second position leverages the yaw movement of the yaw ring. The lifting mechanism 60 is repositioned by yawing the yaw ring.

Figure 8:
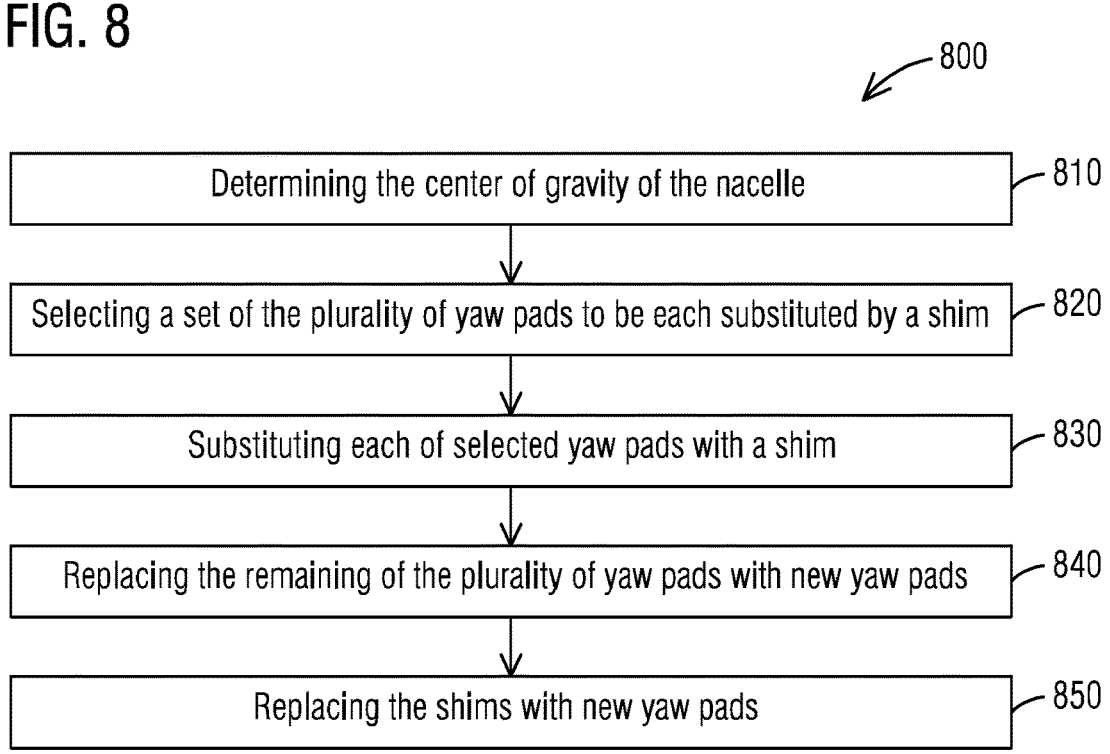
FIG. 8 is a flowchart of a first a method for replacing a plurality of yaw pads.

FIG. 8 describes an embodiment of a method of replacing a plurality of yaw pads, arranged between a tower and a nacelle of a wind turbine, with new yaw pads. The center of gravity of the nacelle is determined (810). The center of gravity may be used to select location of the yaw pads to be substituted. Based on the center of gravity, a set of the plurality of yaw pads to be substituted by a shim is selected (820). Each of the substituted shims comprises a thickness greater than the replaced yaw pad. Each of determined yaw pads are substituted with a shim (830). Wherein the nacelle is balanced on the shims after the replacements. After substituting, the remaining of the plurality of yaw pads are replaced with new yaw pads (840) and subsequently the shims are replaced with new yaw pads (850).

FIG. 9 describes an embodiment of a method that facilitates carrying out one or more of the embodiments described herein. The center of gravity is determined (910) and based on the center of gravity, the location of the yaw pads to be substituted may be selected. A set of the plurality of yaw pads to be each substituted by a shim are selected (920). Each of the shims comprises a thickness greater than the respective replaced yaw pad. A lifting mechanism is positioned at a first location on a yaw ring (930). The nacelle is lifted away from the tower, by the lifting mechanism, to create a clearance (940) for the substitution. At least one of the selected yaw pads is substituted (950) at the clearance.

The set of the plurality of yaw pads may include a first yaw pad and a second yaw pad. In an embodiment, the first and second yaw pads are both substituted without repositioning the lifting mechanism. In another embodiment, the second yaw pad is substituted after repositioning the lifting mechanism to a second position and lifting the nacelle away from the tower, by the lifting mechanism while, in the second position. The lifting mechanism may be lowered before the repositioning.

After the selected yaw pads have been substituted by the shims, the remaining of the plurality of yaw pads are replaced with new yaw pads. A replacement of the shims may be accomplished by reversing the method. For example, using a lifting mechanism to lift the nacelle away from the tower to create a clearance to remove one or more shim. Each removed shim is replaced by a new yaw pad. The lifting mechanism may be lowered after the replacement. The lifting mechanism may be repositioned to replace a one or more further shim. Once each of the shims are replaced, the lifting mechanism is removed.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed is:

1. A method of replacing a plurality of yaw pads, arranged between a tower and a nacelle of a wind turbine, with new yaw pads, the method comprising:
    determining a center of gravity of the nacelle;
    based on the center of gravity, selecting a set of the plurality of yaw pads;
    lifting the nacelle away from the tower to create a clearance for substituting each of the selected yaw pads with shims, each shim comprising a thickness greater than a selected yaw pads, wherein the nacelle is balanced on the shims after the replacements;
    replacing a remaining plurality of yaw pads with new yaw pads after substituting; and
    after the remaining of the plurality of yaw pads are replaced, replacing the shims with the new yaw pads.

2. The method according to claim 1, further comprising:
prior to the substituting:
    positioning a lifting mechanism at a first location on a yaw ring;
    by the lifting mechanism positioned in the first position, lifting the nacelle away from the tower to create the clearance for substituting at least one of the selected yaw pads, and lowering the nacelle onto each substituted shim,
    wherein a first of the set of plurality of yaw pads is replaced while the lifting mechanism is positioned at a first location.

3. The method according to claim 2, further comprising:
before replacing the remaining of the plurality of yaw pads:
    positioning the lifting mechanism at a second location on the yaw ring;
    lifting the nacelle, by the lifting mechanism at the second location, away from the tower to create a clearance;
    substituting a second of the set of the plurality of yaw pads;
    lowering the nacelle onto substituted shims,
    wherein a second of the set of plurality of yaw pads is replaced while the lifting mechanism is positioned at a second location.

4. The method according to claim 2, wherein the first of the set of plurality of yaw pads is a single yaw pad which is substituted while the nacelle is lifted with lifting mechanism in the first position.

5. The method according to claim 3, wherein the second of the set of yaw pads is a single yaw pad which is substituted while the nacelle is lifted with lifting mechanism in the second position.

6. The method according to claim 4, wherein the first of the set of plurality of yaw pads is opposite a center line from the second of the set of plurality of yaw pads.

7. The method according to claim 6, wherein a measure of an angle between the first of the set of plurality of yaw pads and the center line is substantially the same as an angle of the second of the set of plurality of yaw pads and the center line.

8. The method according to claim 2, wherein the first of the set of plurality of yaw pads is a plurality of yaw pads, which is substituted while the nacelle is lifted with lifting mechanism in the first position.

9. The method according to claim 3, wherein the second of the set of yaw pads is a plurality of yaw pad, which is substituted while the nacelle is lifted with lifting mechanism in the second position.

10. The method according to claim 8, wherein the first of the set of plurality of yaw pads is opposite a center line from the second of the set of plurality of yaw pads.

11. The method according to claim 10, wherein a measure of an angle between the first of the set of plurality of yaw pads and the center line is substantially the same as an angle of the second of the set of plurality of yaw pads and the center line.

12. The method according to claim 2, wherein the position of the lifting mechanism arranged so the first of the set of yaw pads to be substituted is between the lifting mechanism and the center of gravity.

13. The method according to claim 3, wherein the position of the lifting mechanism arranged so the second of the set of yaw pads to be substituted is between the lifting mechanism and the center of gravity.

14. The method according to claim 1, wherein a number of yaw pads substituted is two.

15. The method according to claim 3, wherein the positioning the lifting mechanism at a second location on the yaw ring is by a yawing of the yaw ring from the first position to the second position.

16. The method according to claim 3, wherein the lifting mechanism is manually positioned at the second location.

* * * * *